US010405499B2

(12) United States Patent
Bax

(10) Patent No.: US 10,405,499 B2
(45) Date of Patent: Sep. 10, 2019

(54) DOWNPIPE ASSEMBLY

(71) Applicant: Heath William Bax, Melbourne (AU)

(72) Inventor: Heath William Bax, Melbourne (AU)

( * ) Notice: Subject to any disclaimer, the term of this patent is extended or adjusted under 35 U.S.C. 154(b) by 286 days.

(21) Appl. No.: 15/124,617

(22) PCT Filed: Mar. 18, 2015

(86) PCT No.: PCT/AU2015/050114
§ 371 (c)(1),
(2) Date: Sep. 8, 2016

(87) PCT Pub. No.: WO2015/139087
PCT Pub. Date: Sep. 24, 2015

(65) Prior Publication Data

US 2017/0013788 A1 Jan. 19, 2017

(30) Foreign Application Priority Data

Mar. 18, 2014 (AU) ................................ 2014900940

(51) Int. Cl.
*A01G 9/02* (2018.01)
*A01G 25/02* (2006.01)
*A01G 27/00* (2006.01)

(52) U.S. Cl.
CPC ........... *A01G 9/023* (2013.01); *A01G 25/023* (2013.01); *A01G 27/008* (2013.01); *A01G 9/025* (2013.01); *Y02P 60/244* (2015.11)

(58) Field of Classification Search
CPC .......... A01G 9/022–025; A01G 25/023; A01G 27/008
USPC .................................. 47/65.5, 67, 79, 82–83
See application file for complete search history.

(56) References Cited

U.S. PATENT DOCUMENTS 875,235 A * 12/1907 Bastel .................... A01G 9/022 47/82
2,686,988 A * 8/1954 Garber ..................... A47G 7/06 40/722
2,803,923 A * 8/1957 Pratt ...................... A01G 9/023 47/83
2,837,866 A * 6/1958 Esmay .................. A01G 9/023 47/33
(Continued)

FOREIGN PATENT DOCUMENTS

CA 2230731 A1 * 9/1999 ............. A01G 9/023
CA 2694729 A1 * 9/2010 ........... A01K 39/014
(Continued)

OTHER PUBLICATIONS

"International Application No. PCT/AU2015/050114, International Search Report and Written Opinion dated Jun. 15, 2015", (dated Jun. 15, 2015), 12 pgs.

*Primary Examiner* — Magdalena Topolski
*Assistant Examiner* — Morgan T Barlow
(74) *Attorney, Agent, or Firm* — Schwegman Lundberg & Woessner, P.A.

(57) ABSTRACT

An assembly for coupling to a downpipe of a building, including an elongate base support structure, said base support structure having a direction of extent that is coaxial the downpipe; and a series of receptacles coupled in spaced apart positions to the base support member in the direction of extent, wherein each receptacle of the series of receptacles is shaped to hold soil for growing plants therein.

32 Claims, 17 Drawing Sheets

(56) References Cited

U.S. PATENT DOCUMENTS 3,030,735 A * 4/1962 Bodkins ................ A47B 57/56 362/154
3,108,401 A * 10/1963 Richardson ............. A47G 7/03 47/39
3,747,268 A * 7/1973 Linder .................. A01G 9/028 248/539
4,033,072 A * 7/1977 Kobayashi ............. A01G 31/06 47/62 R
4,216,617 A * 8/1980 Schmidt ................ A01G 31/06 47/62 A
4,334,387 A * 6/1982 Karpisek ............... A01G 9/023 47/83
4,380,136 A * 4/1983 Karpisek ............... A01G 9/023 47/39
4,389,813 A * 6/1983 Jaques .................. A01G 9/022 428/18
4,561,208 A * 12/1985 Schultz ................. A01G 9/023 211/189
4,896,456 A * 1/1990 Grant .................... A01G 9/024 47/67
5,052,148 A * 10/1991 Sharon .................. A47G 7/047 248/328
5,251,399 A * 10/1993 Rasmussen ........... A01G 9/023 211/88.03
5,309,671 A * 5/1994 Byun .................... A01G 9/023 47/71
5,555,676 A * 9/1996 Lund ..................... A01G 9/022 47/82
5,669,185 A * 9/1997 Proulx .................. A01G 9/022 47/40
5,724,768 A * 3/1998 Ammann, Jr. ......... A01G 31/02 47/59 R
6,044,585 A * 4/2000 Carruth .................. A01G 9/02 47/65.5
6,209,260 B1 * 4/2001 Surette .................... A01G 9/02 47/65.5
6,269,589 B1 8/2001 Bouler
6,338,419 B1 * 1/2002 Penney ................. A01G 9/022 220/475
6,345,466 B1 * 2/2002 Venanzi ................ A01G 9/022 47/39
6,539,665 B1 * 4/2003 Llona ...................... A01G 9/02 206/423
7,788,848 B1 * 9/2010 Koumoudis ........... A01G 9/025 47/65.9
8,365,466 B1 * 2/2013 Storey ................... A01G 31/06 47/62 C
8,418,403 B1 * 4/2013 Nuttman ................ A01G 9/024 47/82
8,966,819 B1 * 3/2015 Cosmann ............... A01G 9/023 47/83
2002/0005013 A1 * 1/2002 Taylor ................... A01G 9/022 47/66.6
2002/0104264 A1 * 8/2002 Chick ..................... E01F 8/027 47/83
2002/0129551 A1 * 9/2002 Kemp .................. A47F 7/0078 47/83
2003/0196376 A1 * 10/2003 Taylor ................... A01G 9/023 47/66.6
2004/0256394 A1 * 12/2004 Conde ................ A47B 96/1425 220/503
2005/0011124 A1 * 1/2005 Sanderson ............ A01G 31/02 47/79
2005/0166452 A1 * 8/2005 Felknor ................ A01G 9/0291 47/67
2005/0262768 A1 * 12/2005 Cybula .................. A01G 9/023 47/83
2005/0268548 A1 * 12/2005 Lovette .................... A01G 9/02 47/67
2006/0156624 A1 * 7/2006 Roy ...................... A01G 31/02 47/62 R
2006/0231687 A1 * 10/2006 Cieri ..................... A01G 9/023 248/27.8
2008/0110087 A1 * 5/2008 Serio ....................... A01G 9/02 47/65.5
2008/0115414 A1 * 5/2008 Hogan .................. A01G 9/022 47/66.6
2008/0236040 A1 * 10/2008 Sheaffer .................. A01G 9/02 47/65.6
2008/0250712 A1 * 10/2008 DiPaolo ............. A63F 3/00157 47/79
2008/0272252 A1 * 11/2008 Conde ................ A47B 96/1425 248/146
2009/0000189 A1 * 1/2009 Black ..................... A01G 27/02 47/82
2009/0090051 A1 * 4/2009 Hogan ................. A01G 27/003 47/66.6
2009/0107042 A1 * 4/2009 Nunes ................... A01G 9/025 47/83
2009/0113794 A1 * 5/2009 Smith ...................... A01G 9/02 47/65.5
2009/0173004 A1 * 7/2009 Weast ................... A01G 9/023 47/83
2010/0011661 A1 * 1/2010 McLaughlin .......... A47G 7/044 47/67
2010/0146854 A1 * 6/2010 Cannon ................. A01G 9/023 47/82
2011/0258925 A1 * 10/2011 Baker .................... A01G 9/023 47/65.8
2012/0047801 A1 * 3/2012 Hogan .................. A01G 9/022 47/66.6
2012/0167460 A1 * 7/2012 Omidi ................... A01G 9/023 47/65.7
2012/0279126 A1 * 11/2012 Simmons .............. A01G 31/02 47/62 A
2013/0067810 A1 * 3/2013 Kamau .................. A01G 9/022 47/66.6
2013/0118074 A1 * 5/2013 Fulbrook .............. A01G 9/025 47/62 N
2013/0152467 A1 * 6/2013 Chang ................... A01G 9/025 47/82
2013/0219788 A1 * 8/2013 VanLente .............. A01G 9/022 47/62 A
2013/0333287 A1 * 12/2013 Kassouni .............. A01G 9/023 47/83
2015/0059244 A1 * 3/2015 Hashimoto ............ A01G 9/025 47/79
2015/0107156 A1 * 4/2015 Sharp ................. B29C 45/2628 47/79
2015/0128494 A1 * 5/2015 Peterson ............... A01G 9/023 47/82
2015/0181812 A1 * 7/2015 Vezina ................. A01G 9/0297 47/66.7
2015/0208595 A1 * 7/2015 Wood .................. A01G 27/005 47/79
2015/0230412 A1 * 8/2015 Ito ........................... A01G 9/02 47/66.7
2015/0334930 A1 * 11/2015 Stoltzfus ............... A01G 31/06 47/62 A
2016/0066525 A1 * 3/2016 Duquesnay ........... A01G 9/025 47/62 R
2016/0165808 A1 * 6/2016 Brusatore ................ A01G 9/12 47/66.7
2017/0013788 A1 * 1/2017 Bax ....................... A01G 9/023
2017/0258021 A1 * 9/2017 Chiu ..................... A01G 31/02
2017/0339855 A1 * 11/2017 Spets ..................... A01G 7/045
2018/0077877 A1 * 3/2018 Hubert .................. A01G 9/025
2018/0263192 A1 * 9/2018 Irwin .................... A01G 9/022

FOREIGN PATENT DOCUMENTS

CA 2779344 A1 * 5/2011 ............ A01G 9/025
CA 2780261 A1 * 5/2011 ............ A01G 9/025
CA 2716111 A1 * 8/2011 ............ A01G 9/025
CA 2780360 A1 * 9/2012 ............ A01G 9/025
CA 2853757 A1 * 1/2013 ............ A01G 9/023
CA 2979630 A1 * 3/2018 ............ A01G 9/023

(56) References Cited

FOREIGN PATENT DOCUMENTS

| | | | | | |
|---|---|---|---|---|---|
| DE | 3042967 | A1 * | 7/1982 | ............. | A01G 27/04 |
| DE | 3706673 | A1 * | 9/1988 | ............. | A01G 9/025 |
| DE | 29513037 | | 12/1996 | | |
| DE | 202014003692 | U1 * | 1/2015 | ............. | A01G 9/023 |
| DE | 102015007429 | A1 * | 12/2016 | ............. | A01G 9/023 |
| DE | 202016007649 | U1 * | 2/2017 | ............. | A01G 9/025 |
| DE | 202017100704 | U1 * | 2/2017 | ............. | A01G 9/023 |
| DE | 202018001482 | U1 * | 4/2018 | ............. | A01G 9/025 |
| EP | 0222966 | A1 * | 5/1987 | ........... | A01G 25/023 |
| EP | 3153013 | A1 * | 4/2017 | ............. | A01G 9/025 |
| FR | 1562367 | A * | 4/1969 | ............. | A01G 9/022 |
| FR | 2520972 | A1 * | 8/1983 | ............. | A01G 9/023 |
| FR | 2601552 | A1 * | 1/1988 | ............. | A01G 27/04 |
| FR | 2614757 | A1 * | 11/1988 | ............. | A01G 9/023 |
| FR | 2850528 | A1 * | 8/2004 | ............. | A01G 9/023 |
| FR | 3031321 | A1 * | 7/2016 | ............. | B05B 17/08 |
| JP | 07123867 | A * | 5/1995 | ............. | A01G 9/023 |
| JP | 2013146232 | A * | 8/2013 | ............. | A01G 9/025 |
| JP | 2014064558 | A * | 4/2014 | ............. | A01G 9/025 |
| JP | 6025279 | B1 * | 11/2016 | ............. | A01G 9/023 |
| KR | 101172866 | | 8/2012 | | |
| WO | WO-8602523 | A1 * | 5/1986 | ............. | A01G 9/022 |
| WO | WO-2010082717 | A1 * | 7/2010 | ............. | A01G 9/025 |
| WO | WO-2011022359 | A2 * | 2/2011 | ............. | A01G 9/022 |
| WO | WO-2011048657 | A1 * | 4/2011 | ............. | A01G 31/06 |
| WO | WO-2013114261 | A1 * | 8/2013 | ............... | A01G 9/02 |
| WO | WO-2014102775 | A1 * | 7/2014 | ............. | A01G 9/025 |
| WO | WO-2014167576 | A1 * | 10/2014 | ............. | A01G 9/025 |
| WO | WO-2015045087 | A1 * | 4/2015 | ............. | A01G 9/025 |
| WO | WO-2015139087 | | 9/2015 | | |
| WO | WO-2016072042 | A1 * | 5/2016 | ............. | A01G 31/04 |
| WO | WO-2016191596 | A1 * | 12/2016 | ............. | A01G 9/022 |
| WO | WO-2018116225 | A1 * | 6/2018 | ............. | A01G 9/023 |

* cited by examiner

DOWNPIPE ASSEMBLY

PRIORITY CLAIM TO RELATED APPLICATIONS

This application is a U.S. national stage application filed under 35 U.S.C. § 371 from International Application Serial No. PCT/AU2015/050114, which was filed 18 Mar. 2015, and published as WO2015/139087 on 24 Sep. 2015, and which claims priority to Australian Application No. 2014900940, filed 18 Mar. 2014, which applications and publication are incorporated by reference as if reproduced herein and made a part hereof in their entirety, and the benefit of priority of each of which is claimed herein.

TECHNICAL FIELD OF THE INVENTION

The present invention relates to a downpipe assembly.

BACKGROUND OF THE INVENTION

Garden beds, pot plants, and grass lawns, for example, have been used to improve the aesthetic appearance of homes all round the world. Whilst greening a home in this manner no doubt improves the aesthetic value of the homes, it may only be possible to do so where space is available. For example, an inner city town house or terrace may only have a four meter by five meter backyard and every square centimeter of that space is needed for additional living area.

To address the above described problems, vertical garden systems have been developed. These systems generally include one or more pots that have been coupled to a brick wall, for example. Some systems include a support frame for the pots and watering systems. Whilst such systems may achieve the goal of replacing brown brick with green flora, the vertical gardens need to physically be fixed to the wall by way of a split expansion sleeve fastener, such as a DYNABOLT™ brand anchor, which permanently alter the brick wall. Further, it may be difficult, to later move the position of these types of gardens, or take them from residence to residence in the event that you move house. For the above reasons, tenants of rental properties may not be able to set up a vertical garden unless they have the landlord's permission.

Houses typically have guttering systems connected to downpipes which transfer rain water collected on a roof out to a storm water system. Although essential ingredients of a home, downpipes unfortunately have a habit of being located right where you don't need them, like beside the front door, for example, and may by obtrusive and/or not aesthetically appealing.

In most instances the downpipes are underneath the eave line protected from the rain. As such, it may be difficult to grow plants around downpipes with a view to hiding them.

It is generally desirable to overcome or ameliorate one or more of the above mentioned difficulties, or at least provide a useful alternative.

SUMMARY OF THE INVENTION

In accordance with one aspect of the invention, there is provided a vertical garden assembly for coupling to a downpipe of a building, including:

(a) an elongate base support structure, said base support structure having a direction of extent that is coaxial the downpipe; and (b) a series of receptacles coupled, in spaced apart positions, to the base support member in said direction of extent, wherein each receptacle of said receptacles is shaped to hold soil for growing plants therein.

Preferably, the base support structure includes one elongate member that extends an end to end extent of the assembly.

Preferably, each receptacle includes one or more drainage slots so that, in use, water received by a first receptacle in the series in part drains through to the second receptacle in the series and so forth.

Preferably, each one of said receptacles is shaped to at least partially wrap around the downpipe. Preferably, each receptacle has a generally rectangular shape defined by two long sides, two short sides and a base member. A long side of each receptacle 18 is shaped to at least partially wrap around the downpipe. The long side includes a "U" shaped slot shaped to at least partially receive the downpipe 12 therein.

Preferably, the assembly includes fixing apparatus for coupling the base support structure to the downpipe.

The downpipe assembly advantageously provides a garden that can attach to a household downpipe without the need for permanent fixing to the home itself. The downpipe assembly can be installed in a matter of minutes and move it to it next location just as quickly. The unique pots are designed to wrap around the downpipe, maximising the volume of planting as well as covering the downpipe itself.

The assembly helps maximise the visual impact of a home by decorating unattractive downpipes with a beautiful flowing green garden. In conjunction with the appropriate screening the assembly can be used to hide an ugly downpipe and provide something that is both functional and attractive. In most instances, the assembly will be located underneath an eave giving the garden protection from frosts and extreme heat. The assembly can be moved as the seasons change to ensure that the plants growing therein are located in an optimal position for growth.

BRIEF DESCRIPTION OF THE DRAWINGS

Preferred embodiments of the present invention are hereafter described, by way of non-limiting example only, with reference to the accompanying drawing in which.

DETAILED DESCRIPTION OF PREFERRED EMBODIMENTS OF THE INVENTION

Vertical Garden Assembly 10

Figure 1:
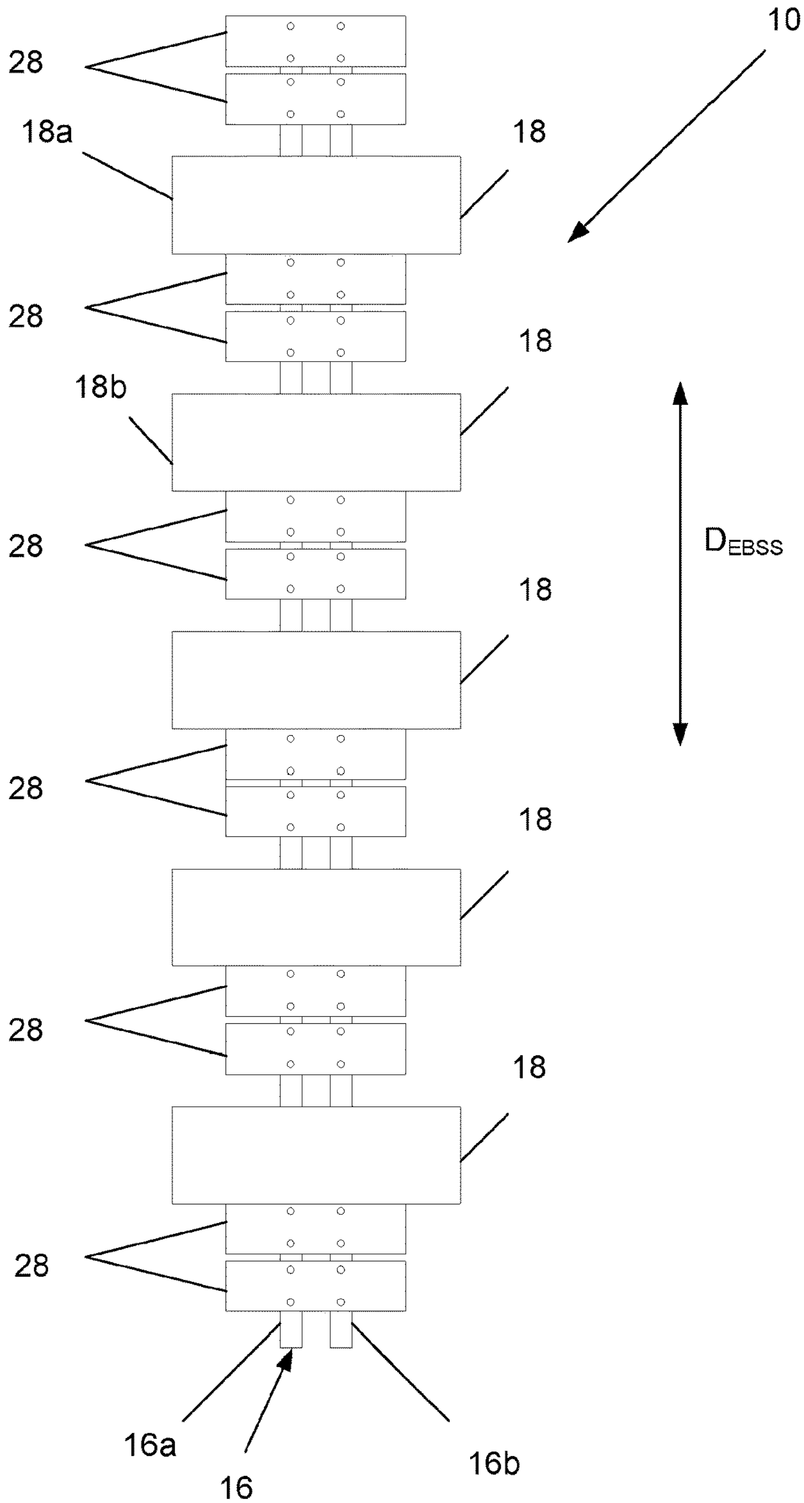
FIG. 1 is a front view of a downpipe assembly.
Figure 2:
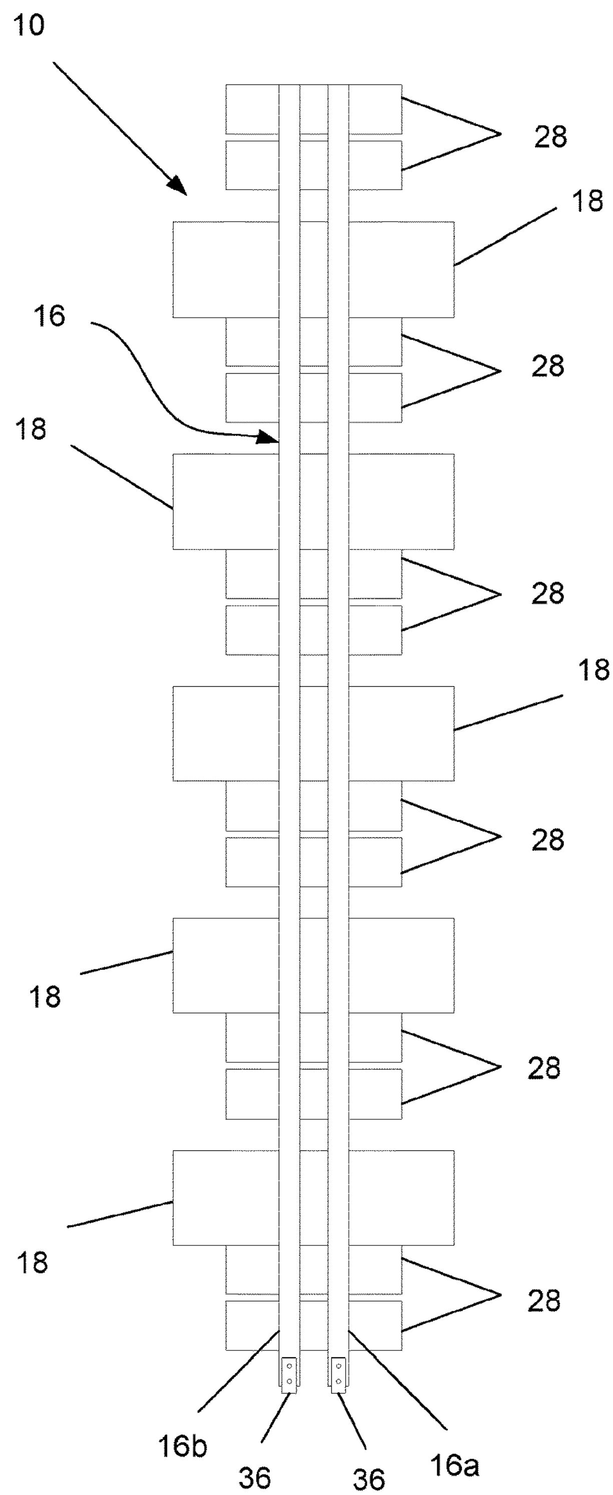
FIG. 2 is a rear view of the downpipe assembly shown in FIG. 1.
Figure 3:
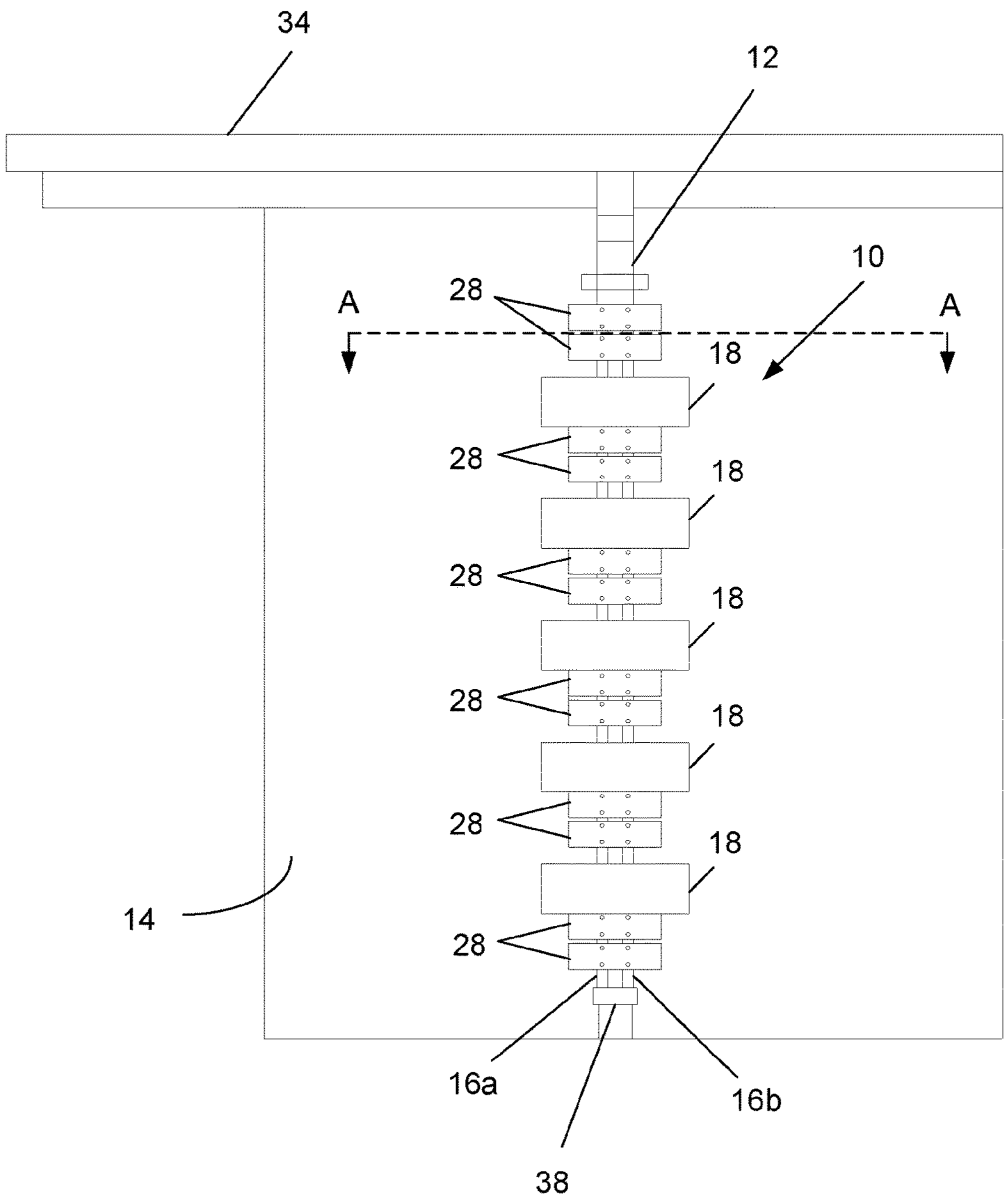
FIG. 3 is a front view of the downpipe assembly shown in FIG. 1 coupled to a downpipe of a building.
Figure 4:
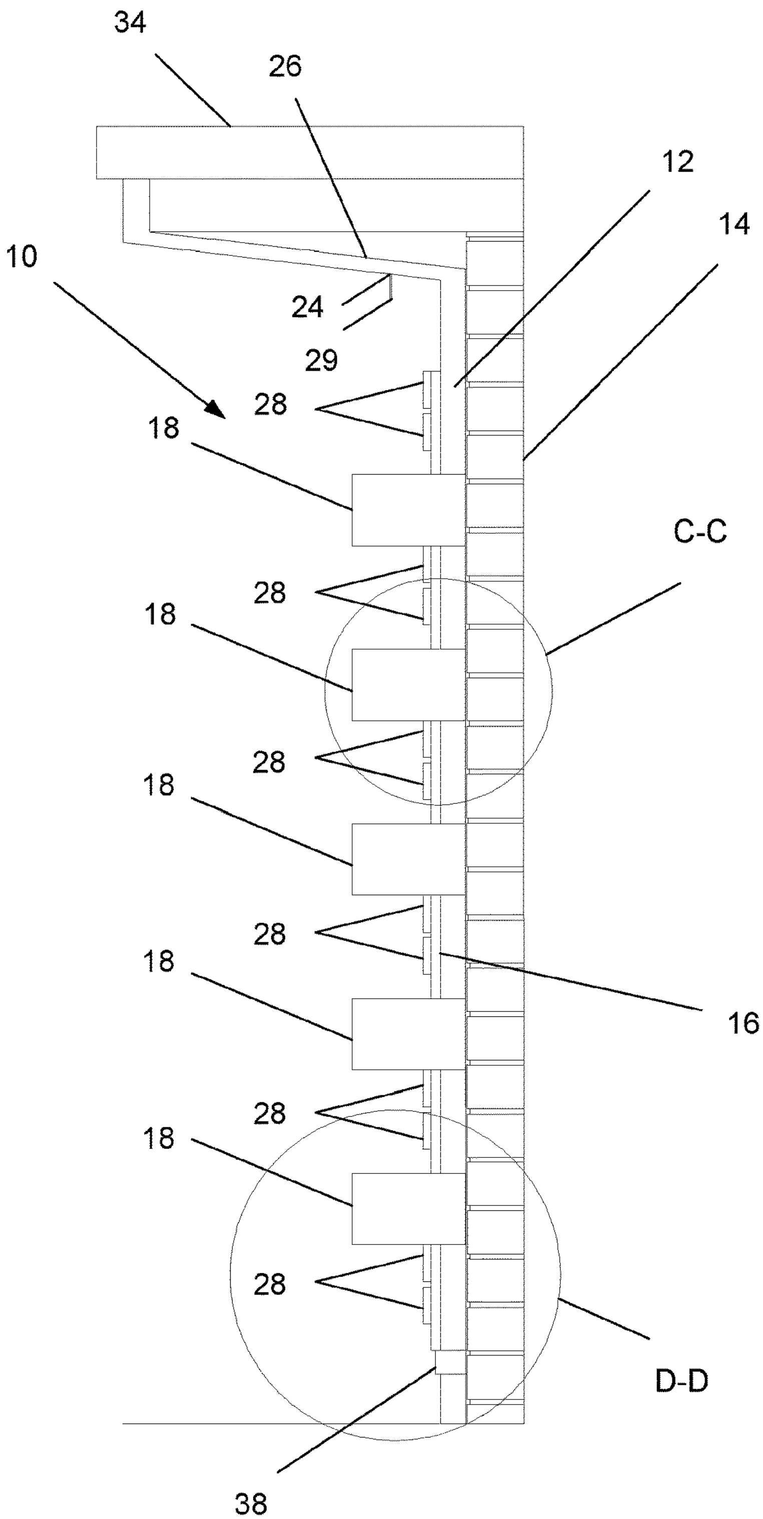
FIG. 4 is a side view of the downpipe assembly and building shown in FIG. 3.

The vertical garden assembly 10 shown in FIGS. 1 and 2 is adapted to be coupled to the downpipe 12 of a building 14 in the manner shown in FIGS. 3 to 7. The assembly 10 includes an elongate base support structure 16, where the base support structure 16 has a direction of extent $D_{EBSS}$ that is coaxial the downpipe 12. The assembly 10 also includes a series of receptacles 18 coupled in spaced apart positions to the base support structure 16 along said direction of extent, $D_{EBSS}$. Each receptacle 18 is shaped to hold soil (not shown) for growing plants therein.

The assembly 10 holds a garden that attaches to your household downpipe 12 without the need for permanent fixing to the building 14 itself. You can preferably install the assembly 10 in a matter of minutes and move it to it next location just as quickly. As described in further detail below, the receptacles 18 are preferably pots that are designed to wrap around the downpipe 12, maximising the volume of planting as well as covering the downpipe 12 itself.

The assembly 10 improves the aesthetic value of the home by decorating unattractive, ugly downpipes, with a beautiful flowing green garden instead. Although essential ingredients of a home, downpipes unfortunately have a habit of being right where you don't need them i.e. beside your front door. The assembly 10 can be readily separated from a downpipe 12 with a view to movie assembly 10 to another location without damaging the building 14 or the downpipe 12.

In conjunction with the appropriate screening a person can use the assembly 10 to hide an ugly downpipe 12 and provide something that is both functional and attractive. In most instances the assembly 10 will be located underneath an eave line 34 of the building 14 giving the garden protection from frosts and extreme heat. Depending upon what aspect is the most advantageous for the plants you have in your garden you can position the assembly 10 to be in the best position possible as there are approximately five downpipes evenly distributed around the average home. The assembly 10 can be moved as the seasons change to ensure that the plants growing therein are located in an optimal position for growth.

The base support structure 16 preferably includes one elongate member that extends an end to end extent of the assembly 10. Alternatively, the base support structure 16 includes two adjacent elongate members 16*a*, 16*b* that extend in parallel an end to end extent of the assembly 10.

As particularly shown in FIGS. 7 and 8*a* to 8*d*, each receptacle 18 includes one or more drainage slots 20 so that, in use, water received by a first receptacle 18*a* in the series, in part, drains through to the second receptacle 18*b* in the series, and so forth. Although the receptacle 18 is shown to include two slots 20, each receptacle 18 can include any suitable combination of one or more slots 20.

Although the assembly 10 is shown with five receptacles 18, the assembly can be used with any suitable number of receptacles 18.

Figure 7:
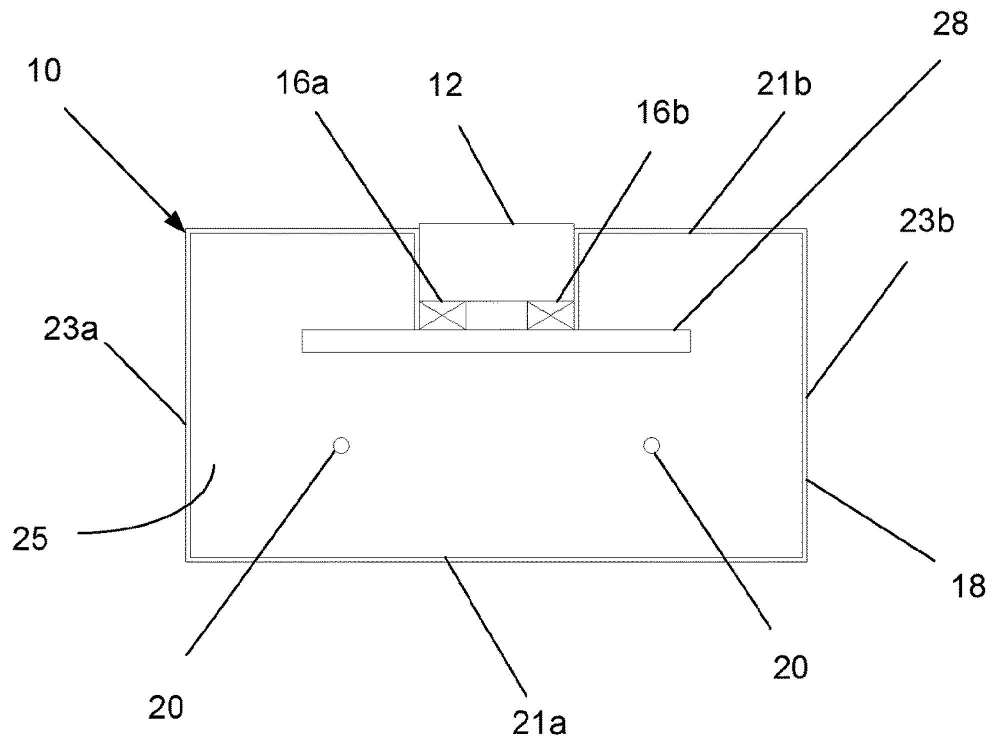
FIG. 7 is a section view through the line A-A of the downpipe assembly shown in FIG. 3.
Figure 8A:
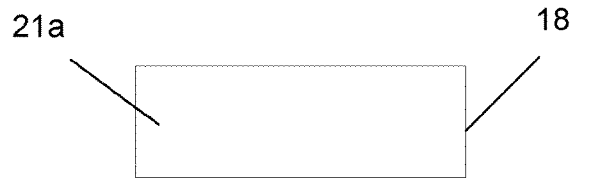
FIGS. 8*a* to 8*d* are views of pots of the downpipe assembly shown in FIG. 2.
Figure 8B:
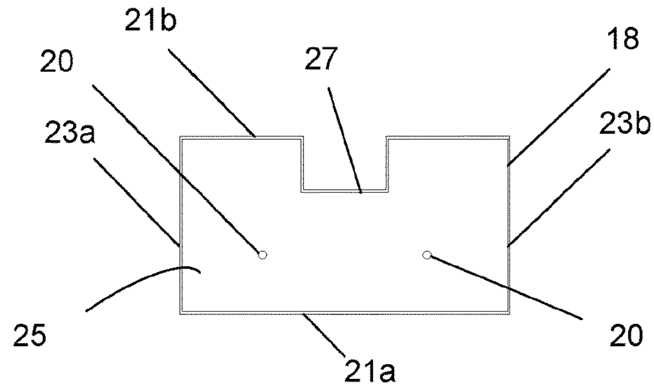
Figure 8C:
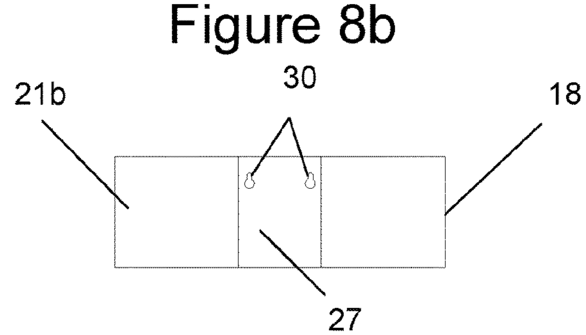
Figure 8D:
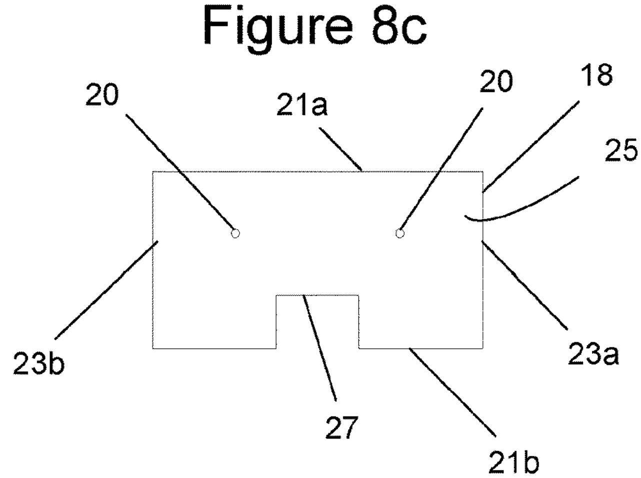

As particularly shown in FIGS. 7 and 8*a* to 8*b*, each receptacle 18 has a generally rectangular shape defined by two long sides 21*a*, 21*b* two short sides 23*a*, 23*b* and a base member 25. The long side 21*b* of each receptacle 18 is shaped to at least partially wrap around the downpipe 12. Preferably, the long side 21*b* includes a "U" shaped slot 27 shaped to at least partially receive the downpipe 12 therein. In a preferred embodiment, the long side 21*b* of each receptacle 18 overlies and/or abuts the building 12 when the assembly is coupled to a drain pipe 12.

The base support structure 16 is preferably interposed between the "U" shaped receptacles 18 and the downpipe 12. Alternatively, the base support structure can be arranged in any other suitable location.

Figure 5:
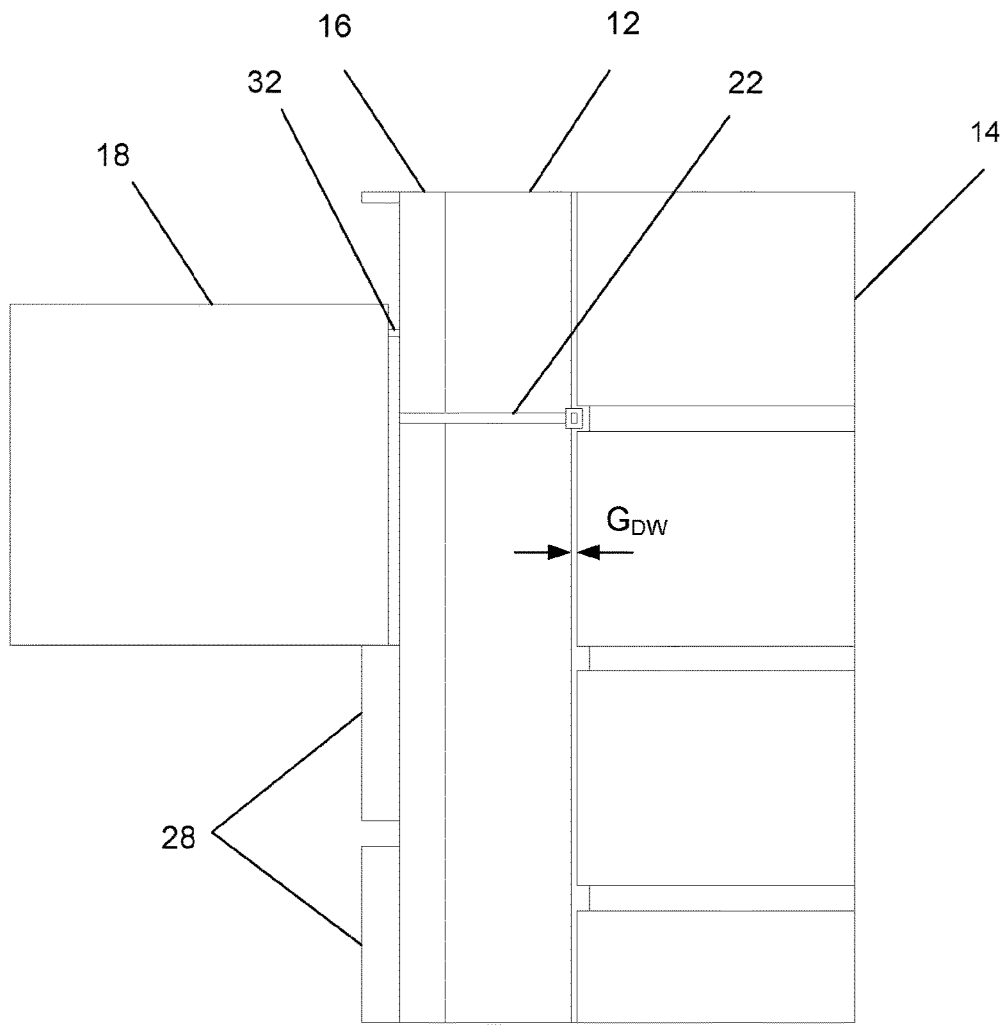
FIG. 5 is an enlarged view of section C-C shown in FIG. 4.
Figure 6:
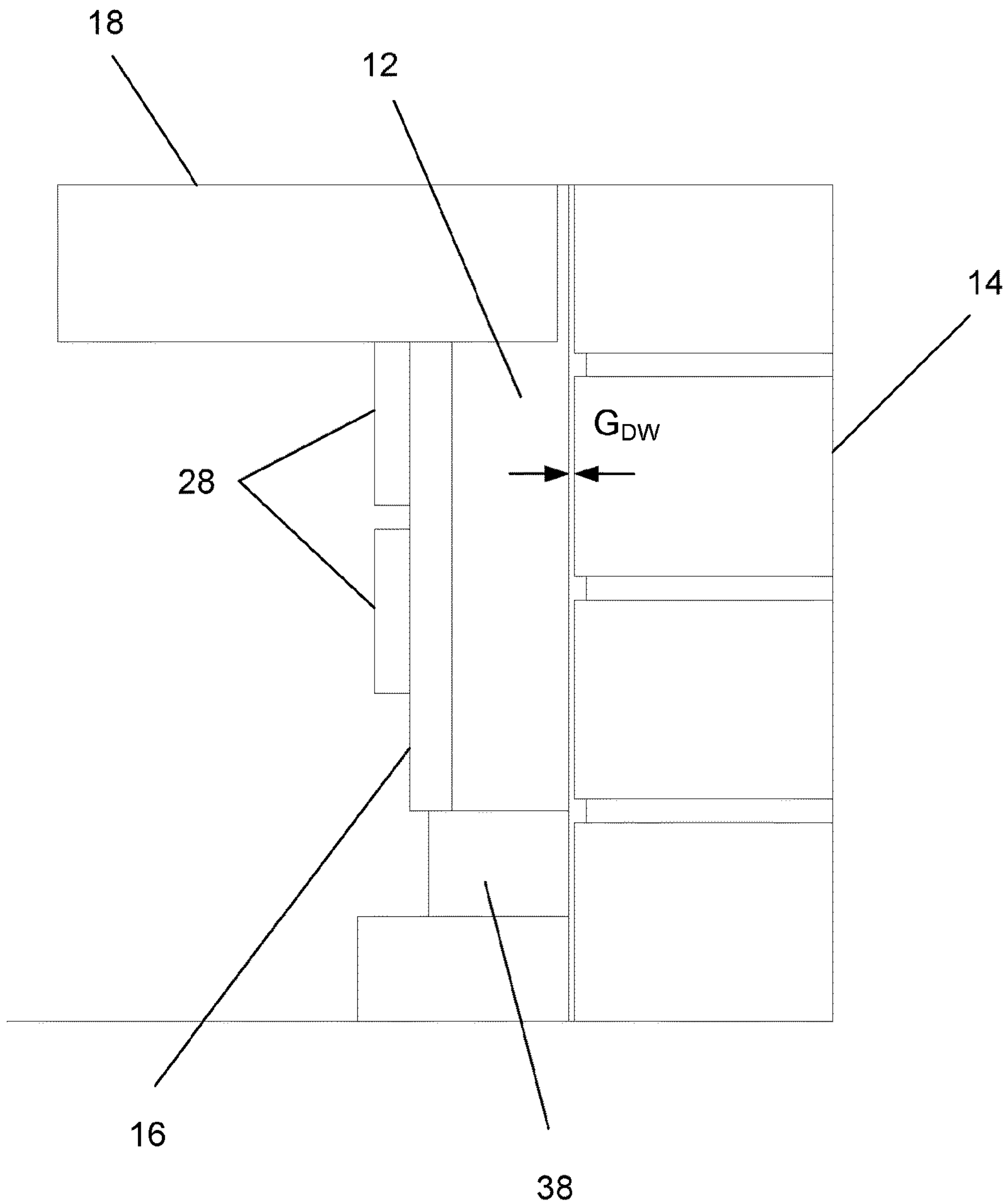
FIG. 6 is an enlarged view of section D-D shown in FIG. 4.

As particularly shown in FIG. 5, the assembly 10 includes fixing apparatus 22 for coupling the base support structure 16 to the downpipe 12. The fixing apparatus 22 preferably includes one or more cable ties. Alternatively, the fixing apparatus 22 includes any other suitable means for coupling the base support structure 16 to the downpipe 12.

The assembly 10 also includes a vertical drip point 24 for coupling to a section of the downpipe 12 so as to divert some of the water travelling through the downpipe 12 into a first receptacle 18*a* in the series of receptacles 18. The vertical drip point 24 is preferably a slot formed in a lateral section 26 of the downpipe 12. Alternatively, the vertical drip point 24 is a slot formed in a vertical section of the downpipe 12.

The assembly 10 also includes a plurality of receptacle supports 28 coupled in spaced apart positions to the base member 16. The receptacle supports 28 are located so as to at least partially have seated thereon a corresponding one of the receptacles 18. So arranged, the receptacle supports 28 each, in part, support vertical loads of corresponding receptacles 18. The receptacle supports 28 also act to at least partially obscure view of the base support member and/or the downpipe.

As shown, the receptacle supports 28 are arranged in pairs of generally rectangular boards interposed between adjacent receptacles 18 in the series of receptacles 18. Alternatively, the receptacle supports 28 may each comprise one member of any other suitable shape and configuration to either partially support receptacles 18 and/or obscure the downpipe 12.

As particularly shown in FIGS. 8*a* to 8*d*, the receptacles 18 are removably coupled to the base support structure 16. To facilitate this, the receptacles 18 include one or more slots 30 shaped to mate with lugs 32 in the manner shown in FIG. 5. Alternatively, the receptacles 18 may be secured to the base support structure 16 by any other suitable means. The receptacles 18 may be permanently secured to the base support structure 16.

The downpipe assembly 10 provides a garden that can attach to a household downpipe 12 without the need for permanent fixing to the home 14 itself. The downpipe assembly 10 can be installed in a matter of minutes and move it to it next location just as quickly. The unique pots 18 are designed to wrap around the downpipe 12, maximising the volume of planting as well as covering the downpipe 12 itself.

A preferred embodiment of the assembly is below described with reference to the accompanying drawings. The assembly 10 includes two 30×18 mm treated pine vertical uprights 16*a*, 16*b*. The uprights 16*a*, 16*b* are placed vertically on the face of the downpipe 12 and the two uprights 16*a*, 16*b* are spaced so that they are the same width as the downpipe 12. Flat metal cleats 36 are screwed onto the bottom of each of the treated pine uprights 16*a*, 16*b*. The cleats 36 protrude approximately 10 mm from the bottom of the uprights 16*a*, 16*b* and slip into the top of the downpipe reducer 38. The cleats 36 prevent the uprights 16*a*, 16*b* from slipping either downward or away from the surface of the wall 14. By sitting the uprights 16*a*, 16*b* above the reducer 38 you are also keeping the assembly 10 above any termite barriers that maybe within the external cladding of the home.

Timber screening panels 28 are then coupled to the vertical uprights 16*a*, 16*b*. The panels 28 serve several purposes:

1. spacers for the vertical uprights 16*a*, 16*b;*
2. a visual screen hiding the downpipe 12 itself; and
3. provide support to the pots 18 bearing part of the weight from plants, soil and the pots themselves.

External 25 mm screws 32 are driven partially into the vertical uprights in the appropriate positions, ready to take the pots once the frame is secured in place. The screw 32 are positioned to mate with slots 30 of the pots 18.

Once the frame work 16 has been made the garden is lifted into position with the metal cleats 36 dropped into the reducer 38, and the vertical uprights pushed against the face of the downpipe 12, the assembly 10 is secured to the downpipe 12 with 400 mm long cable ties 22. The ties 22 are threaded between the rear of the downpipe 12 and the external cladding ($G_{DW}$=approx. 2.5 mm). The ties 22 are positioned where the pots 18 will be positioned so that when the pots 18 are installed you cannot see the ties 22. The ties 22 should be spaced at no more than 900 mm centres, for example, and preferably close to a downpipe saddle.

The pots 18 are lifted into position so that the slots 30 mate with corresponding lugs 32, ensuring that the base of the pot 18 is sitting on the timber screening panel 28 below.

The vertical drip point 24 is then installed by drilling a small 3 mm hole in the lateral section 26 of the downpipe 12 directly above the centre of your highest pot 18*a*. A small chain 29, or plastic strip, is coupled to the downpipe 12 at the location of the hole. Water travels down the chain 29 when it rains. This will direct a controlled flow of rainwater from your downpipe 12 onto your highest pot 18*a*, the water will filter down through the soil and the drainage points 20 at the bottom of the pots, dripping down to the next pot 18*b* and so on. Affectively watering itself while you're not there.

The assembly 10 is now ready for plants and soil to be added, the pots 18 can easily be detached and reattached for this purpose. If you don't like the position of this garden or the aspect of the garden in relation to the plants you have chosen, simply remove the pots 18, cut the cable ties 22 and move it to another downpipe location on your home. Or if you are moving home take it with you and attach it there.

Vertical Garden Assembly 100

Figure 9:
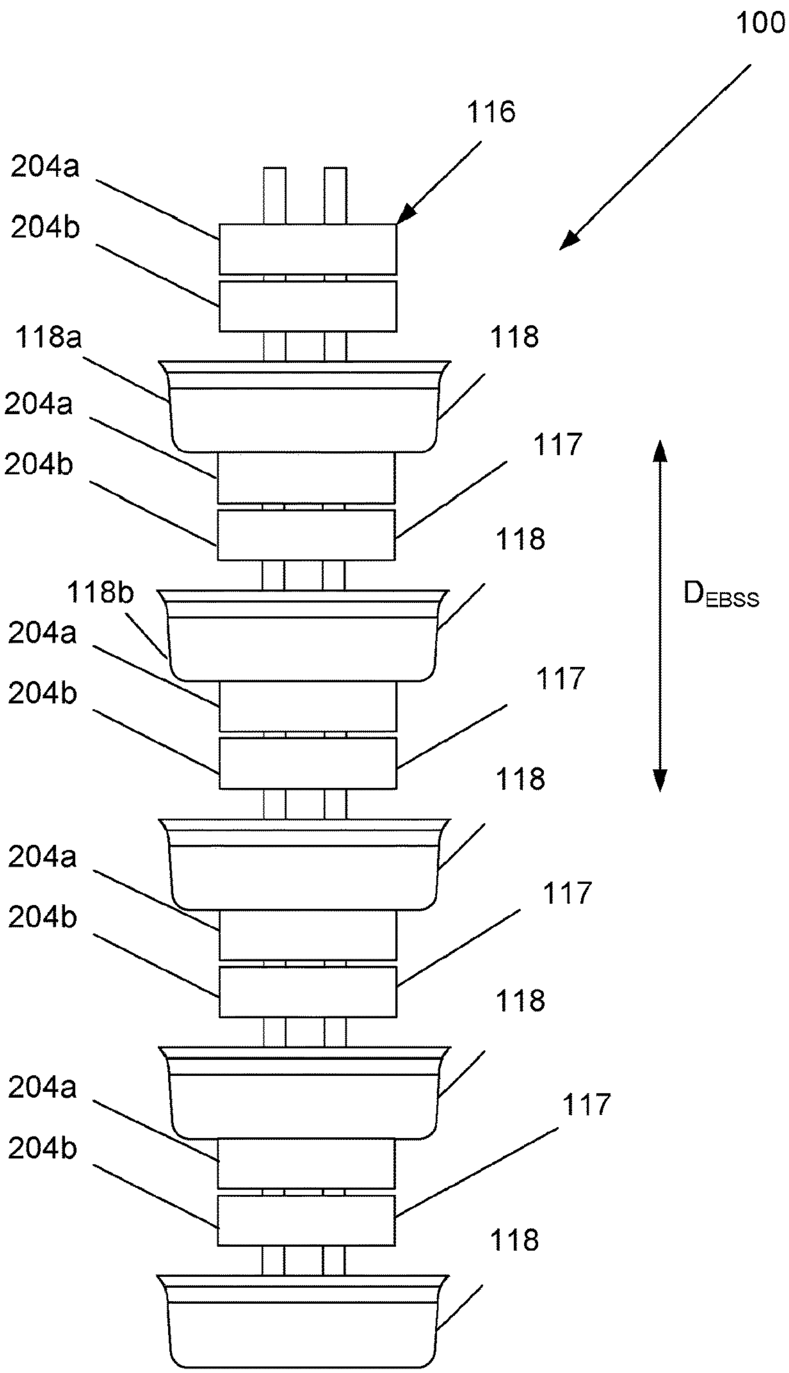
FIG. 9 is a front view of another downpipe assembly.
Figure 10:
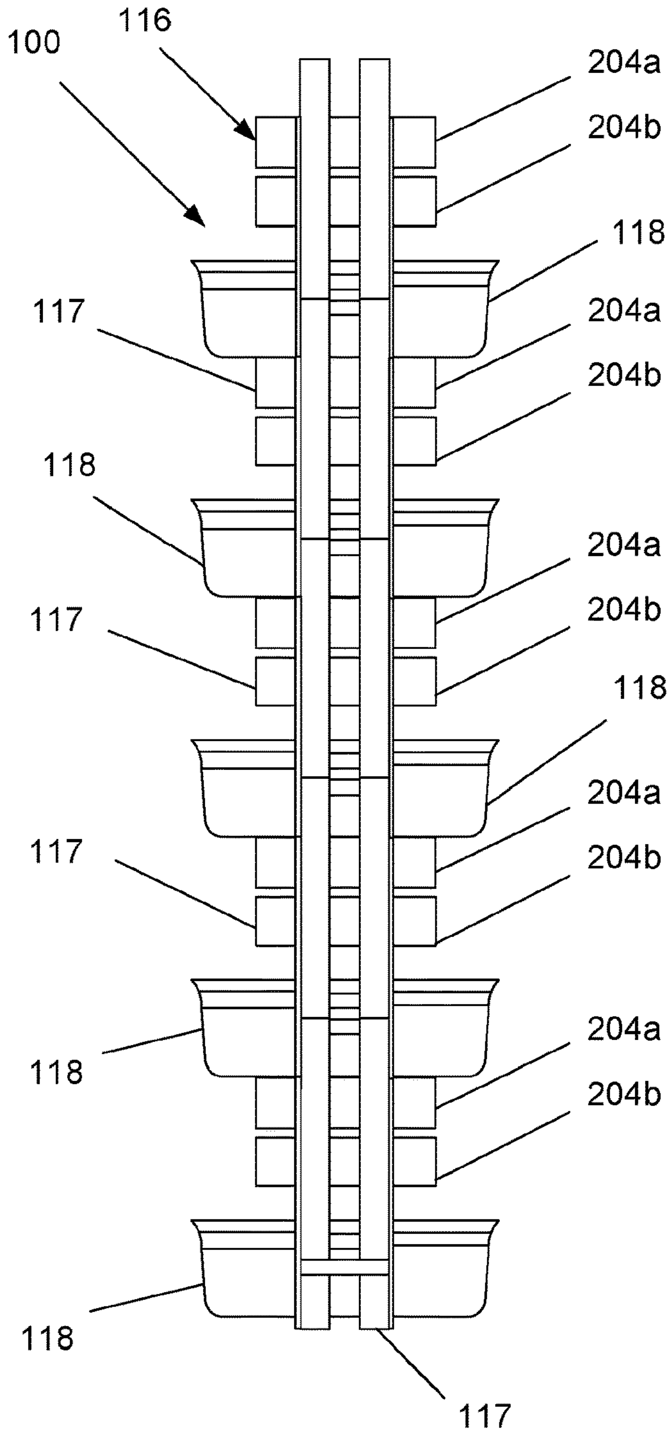
FIG. 10 is a rear view of the downpipe assembly shown in FIG. 9.
Figure 11:
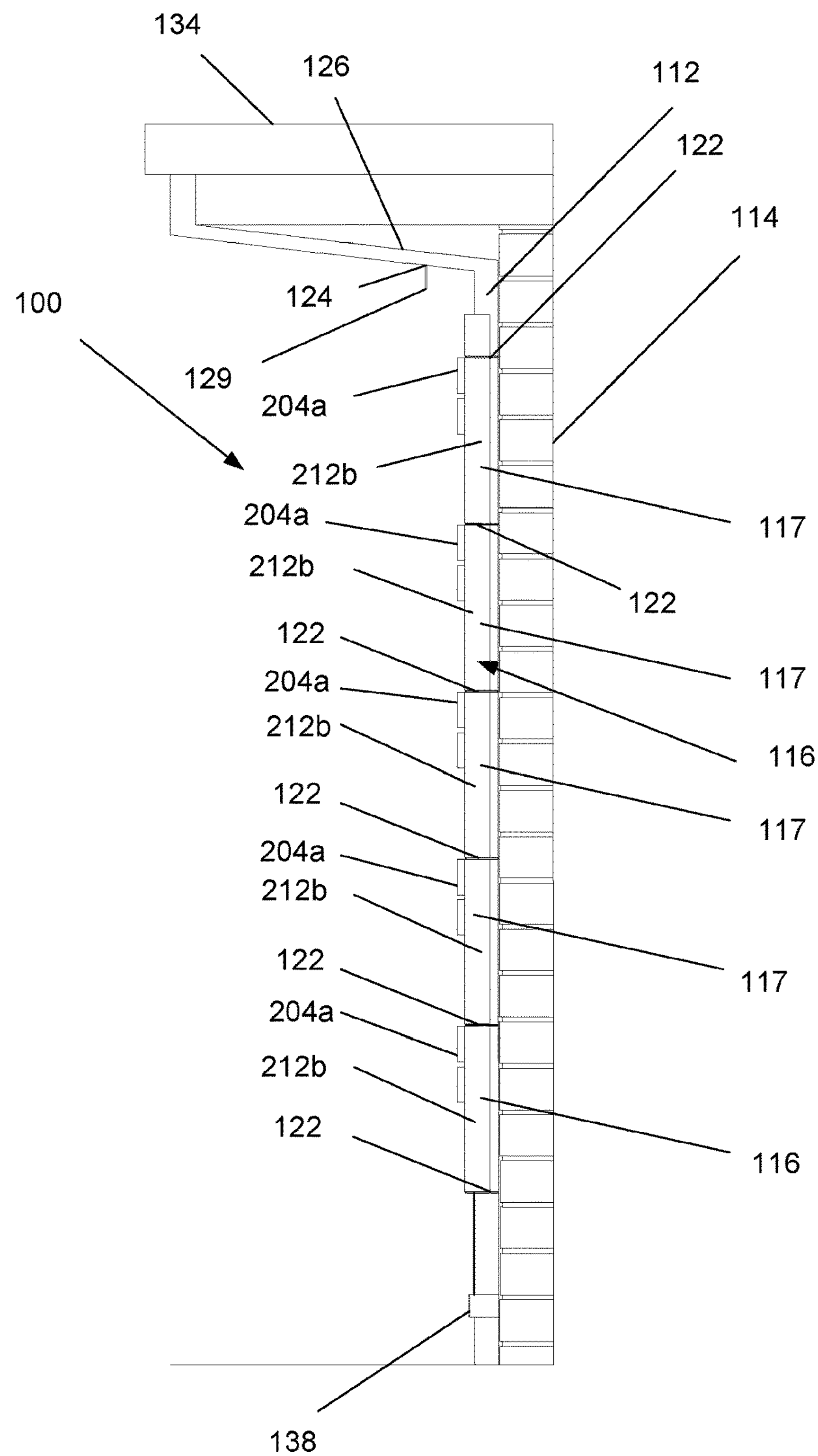
FIG. 11 is a side view of the downpipe assembly shown in FIG. 1 during a condition of use.
Figure 12:
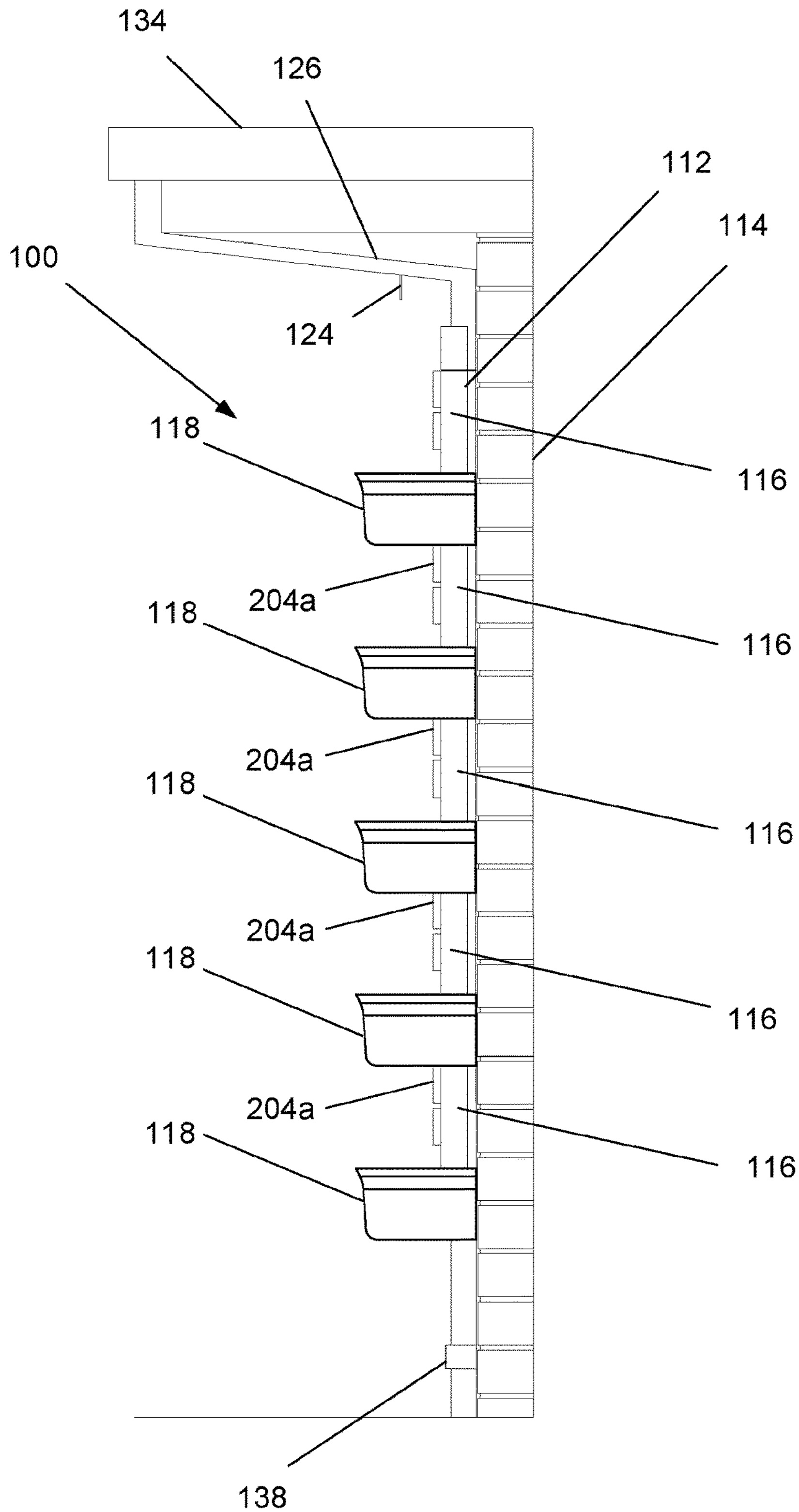
FIG. 12 is a side view of the downpipe assembly shown in FIG. 1 during another condition of use.
Figure 13A:
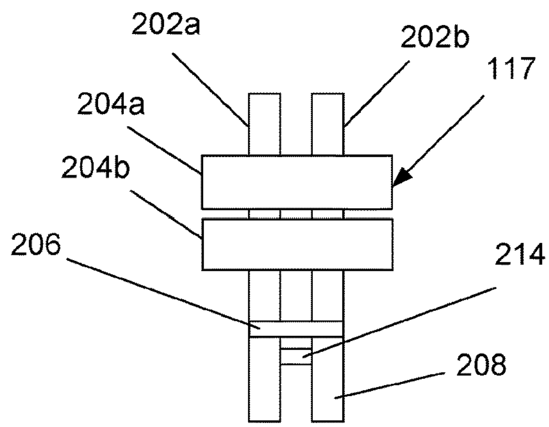
FIG. 13*a* is a front view of a segment of the assembly shown in FIG. 9.
Figure 13B:
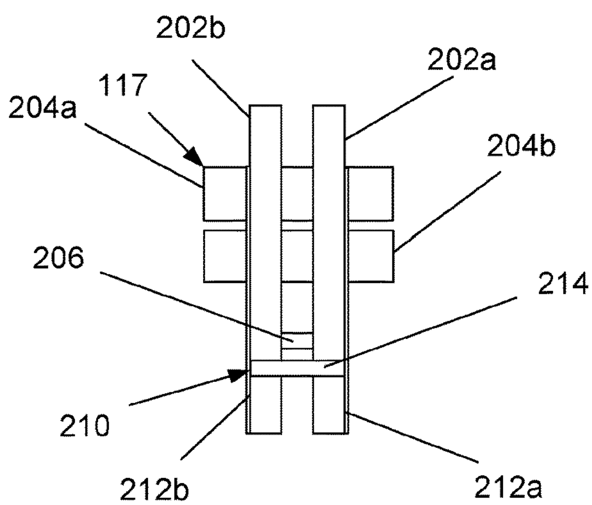
FIG. 13*b* is a back view of the segment shown in FIG. 13*a;*
Figure 13C:
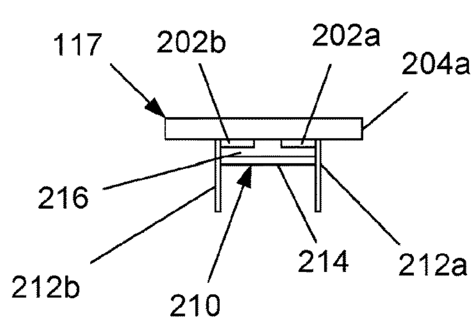
FIG. 13*c* is a top view of the segment shown in FIG. 13*a;*

The vertical garden assembly 100 shown in FIGS. 9 and 10 is adapted to be coupled to the downpipe 112 of a building 114 in the manner shown in FIGS. 11 and 12. The assembly 100 includes a base support structure 116 made up of a plurality of frame segments 117, as shown in FIGS. 13*a* to 13*c*, that coupled together in series to form a spine 116 for the assembly 100. The base support structure has a direction of extent $D_{EBSS}$ that is coaxial the downpipe 112. The assembly 100 also includes a series of receptacles 118 coupled in spaced apart positions to respective ones of the segments 117 in said direction of extent, $D_{EBSS}$. Each receptacle 118 is shaped to hold soil (not shown) for growing plants therein.

The assembly 100 holds a garden and is adapted to be attached to a household downpipe 112 without the need for permanent fixing to the building 114 itself. The assembly 100 can be installed in a matter of minutes and it can be moved to a next location just as quickly. As described in further detail below, the receptacles 118 are preferably pots that are designed to wrap around the downpipe 112, maximising the volume of planting as well as covering the downpipe 112 itself.

The assembly 100 improves the aesthetic value of a building by decorating unattractive, ugly downpipes, with a beautiful flowing green garden instead. Although essential ingredients of a building, downpipes unfortunately have a habit of being right where you don't need them i.e. beside you front door. The assembly 100 can be readily separated from a downpipe 112 with a view to moving the assembly 10 to another location without damaging the building 114 or the downpipe 112.

In conjunction with the appropriate screening a person can use the assembly 100 to hide an ugly downpipe 112 and provide something that is both functional and attractive. In most instances the assembly 100 will be located underneath an eave line 134 of the building 114 giving the garden protection from frosts and extreme heat. Depending upon what aspect is the most advantageous for the plants you have in your garden you can position the assembly 100 to be in the best position possible as there are approximately five downpipes evenly distributed around the average home. The assembly 100 can be moved as the seasons change to ensure that the plants growing therein are located in an optimal position for growth.

As particularly shown in FIGS. 13*a* to 13*c*, each segment 117 includes:

a. first and second uprights 202*a*, 202*b* separated by two horizontal bridging members 204*a*, 402*b;*
b. a receptacle fastener 206 that bridges a front side 208 of a lower section of the uprights 202*a*, 202*b*; and
c. a segment fastener 210, including:
   i. two lateral fasteners 212*a*, 212*b* that extend along corresponding uprights 202*a*, 202*b*; and
   ii. a transverse fastener 214 that bridges the lateral fasteners 212*a*, 212*b*.

As shown in FIG. 13*c*, a gap 216 is defined between the uprights 202*a*, 202*b*, the lateral fasteners 212*a*, 212*b*, and the transverse fastener 214. This gap 216 is of sufficient size to receive upper sections of uprights 202*a*, 202*b* of the next successive segment 117 in the series of assembly 100. As shown in FIGS. 15*a* to 17*b*, the segments 117 of the assembly 100 interlock in this manner. The lateral fasteners 212*a*, 212*b* bear against respective uprights 202*a*, 202*b* of the next successive segment 117 and thereby inhibit lateral movement of the same. The transverse fastener 214 also bear against respective uprights 202*a*, 202*b* of the next successive segment 117 and thereby inhibit transverse movement of the same. As such, the combined action of the lateral fasteners 212*a*, 212*b* and the transverse fastener 214 locks the segments 117 in position and inhibits further relative movement.

As particularly shown in FIGS. 14*a* to 14*f*, each receptacle 118 includes one or more drainage slots 120 so that, in use, water received by a first receptacle 118*a* in the series, in part, drains through to the second receptacle 118*b* in the series, and so forth. Although the receptacle 118 is shown to include two slots 120, each receptacle 118 can include any suitable combination of one or more slots 120. As particularly shown in FIG. 14*f*, the slots 120 include a raised edge 119 which extends a distance $D_H$ above the base 25 of the receptacle. The raised edge 119 ensures that a small amount of water is retained at the bottom of each receptacle. That is, only once the well is full, will water flow from the receptacle 118*a*, through the slot 120, and into the next receptacle 118*b* in the series.

Each receptacle 118 has a generally kidney shape partly defined by two long sides 121*a*, 121*b* two short sides 123*a*, 123*b* and a base member 125. The long side 121*b* of each receptacle 118 is shaped to at least partially wrap around the downpipe 112. Preferably, the long side 121*b* includes a "U" shaped slot 127 shaped to at least partially receive the downpipe 112 therein. In a preferred embodiment, the long side 121*b* of each receptacle 118 overlies and/or abuts the building 114 when the assembly is coupled to a drain pipe 112.

As particularly shown in FIG. 11, the assembly 100 includes fixing apparatus 122 for coupling the segments 116 to the downpipe 112. The fixing apparatus 122 preferably includes one or more cable ties. Alternatively, the fixing apparatus 122 includes any other suitable means for coupling the segments 117 to the downpipe 112.

The assembly 100 also includes a vertical drip point 124 for coupling to a section of the downpipe 112 so as to divert some of the water travelling through the downpipe 112 into a first receptacle 118*a* in the series of receptacles 118. The vertical drip point 124 is preferably a slot formed in a lateral section 126 of the downpipe 112. Alternatively, the vertical drip point 124 is a slot formed in a vertical section of the downpipe 112.

The horizontal bridging members 204*a*, 204*b* are located so as to at least partially have seated thereon a corresponding one of the receptacles 118. So arranged, the receptacle members 204*a*, 204*b* each, in part, support vertical loads of corresponding receptacles 118. The members 204*a*, 204*b* also act to at least partially obscure view of the base support member and/or the downpipe 112.

As shown, the members 204*a*, 204*b* are arranged in pairs of generally rectangular boards interposed between adjacent receptacles 118 in the series of receptacles 118. Alternatively, the members 204*a*, 204*b* may each comprise one member of any other suitable shape and configuration to either partially support receptacles 118 and/or obscure the downpipe 112.

Figure 14A:
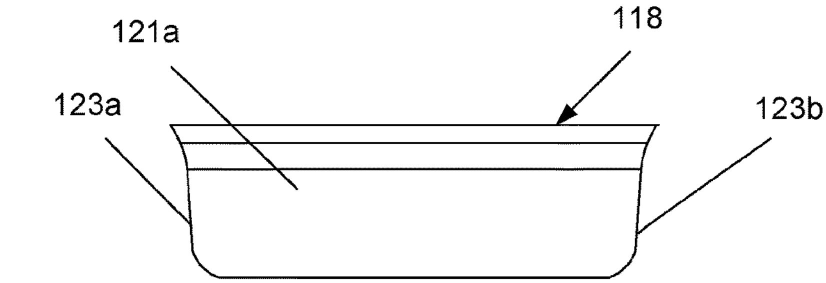
FIGS. 14*a* and 14*b* are front and back views of a receptacle of the assembly shown in FIG. 9.
Figure 14B:
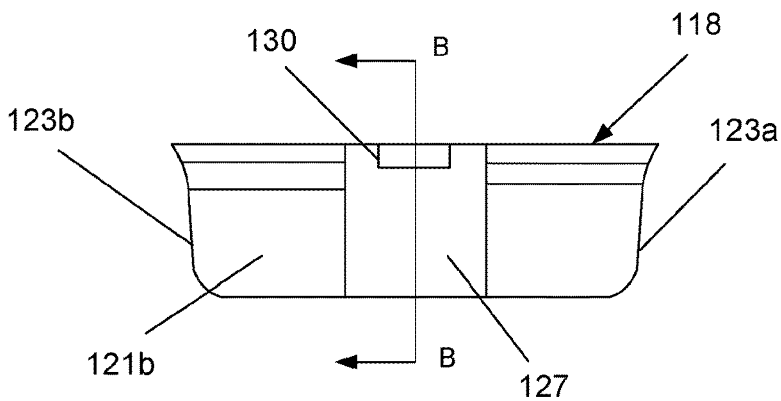
Figure 14C:
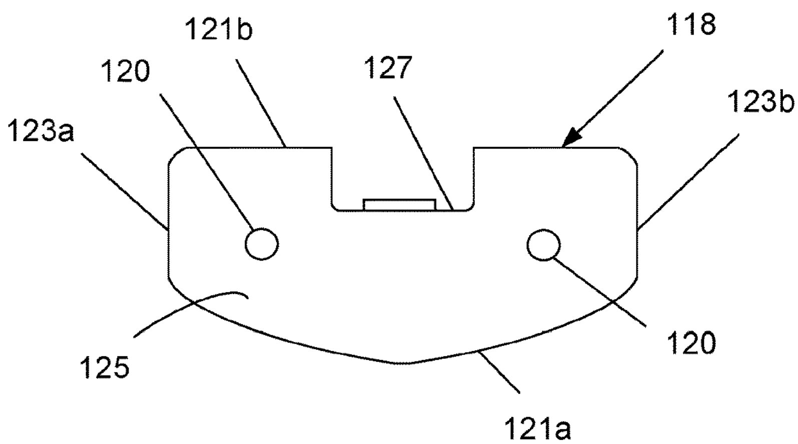
FIGS. 14*c* and 14*d* are top and bottom views of the receptacle shown in FIG. 14*a;*
Figure 14D:
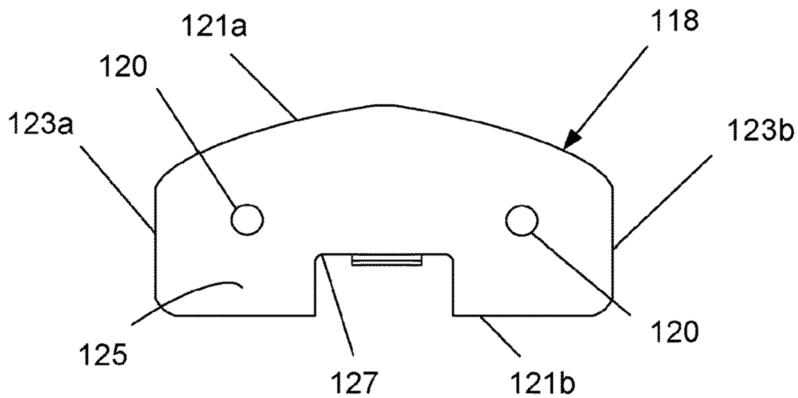
Figure 14E:
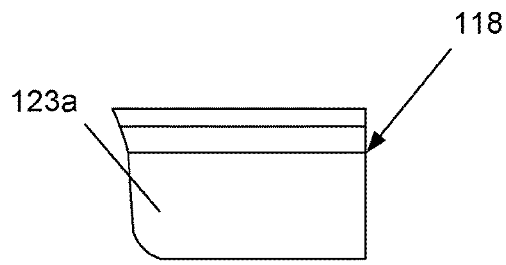
FIG. 14*e* is a side view of the receptacle shown in FIG. 14*a;*
Figure 14F:
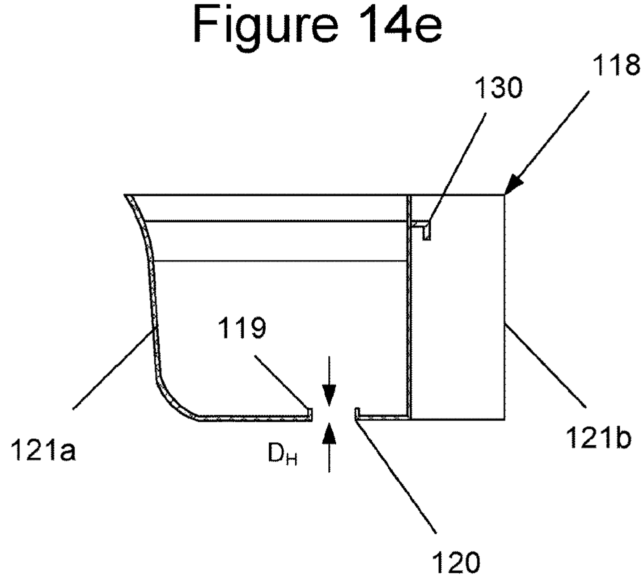
FIG. 14*f* is a section view through the line B-B of the receptacle shown in FIG. 14*b;*
Figure 15A:
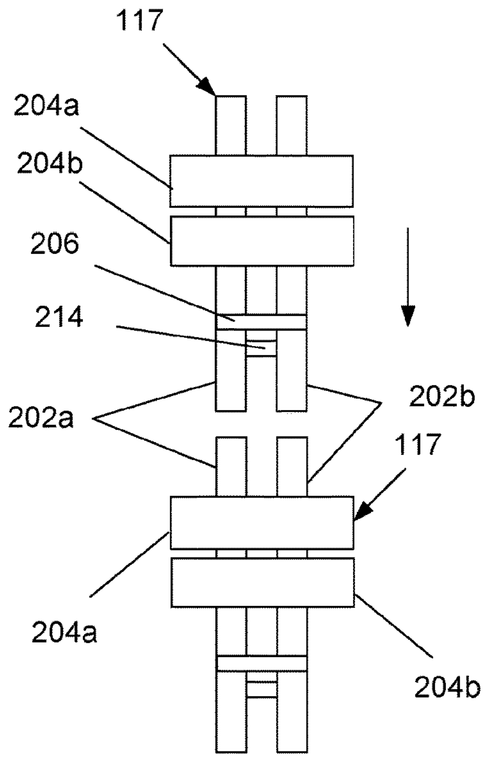
FIGS. 15*a* and 15*b* are front and back views of two segments of the assembly shown in FIG. 9 being coupled together.
Figure 15B:
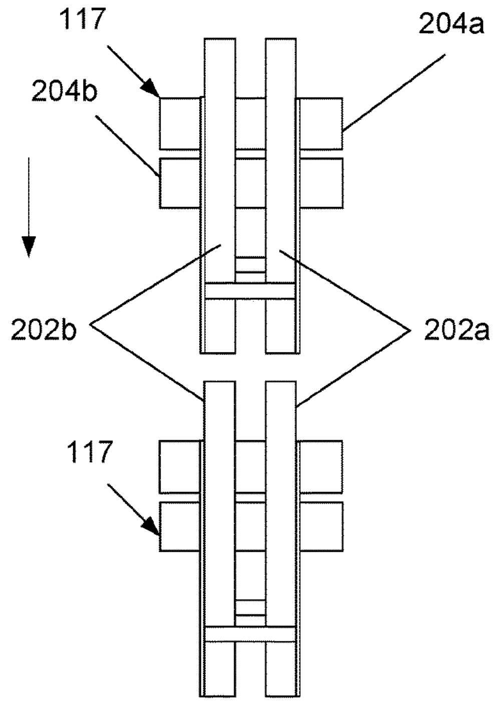
Figure 16A:
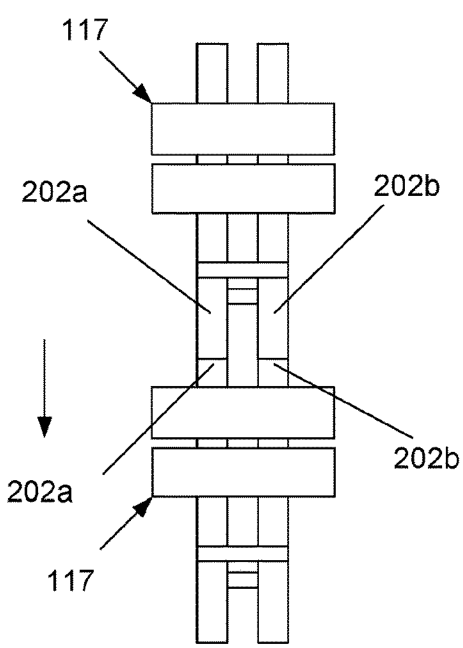
FIGS. 16*a* and 16*b* are front and back views of the two segments shown in FIGS. 15*a* and 15*b* during a further stage of assembly.
Figure 16B:
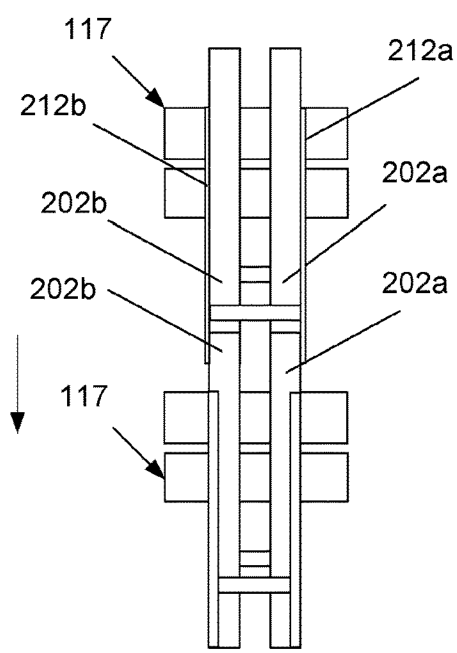
Figure 17A:
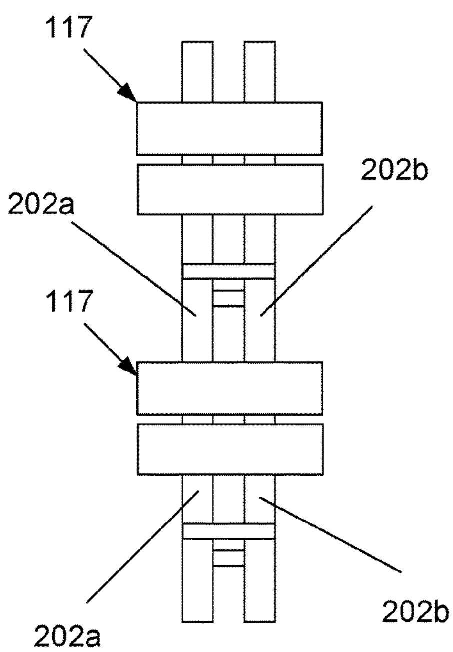
FIGS. 17*a* and 17*b* are front and back views of the two segments shown in FIGS. 15*a* and 15*b* during a still a further stage of assembly.
Figure 17B:
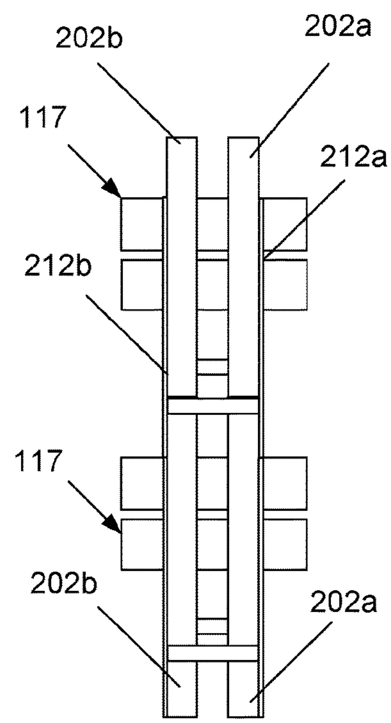

As particularly shown in FIGS. 11, 12 and 14*f*, the receptacles 118 are removably coupled to the respective segments 117. To facilitate this, the receptacles 118 include a fastener 130 shaped to mate with a corresponding fastener 132 of the segment 117 in the manner shown in FIG. 12. As shown, the fastener 130 is an "L" shaped hook and the fastener 132 is a cross member of the segment 117. Alternatively, the fasteners 130 and 132 are any suitable means of inter-locking the pots 118 to the segments 117.

The receptacles 118 may be permanently secured to the segments 117.

The downpipe assembly 100 provides a garden that can attach to a household downpipe 112 without the need for permanent fixing to the home 114 itself. The downpipe assembly 100 can be installed in a matter of minutes and move it to it next location just as quickly. The unique pots 118 are designed to wrap around the downpipe 112, maximising the volume of planting as well as covering the downpipe 112 itself.

Once the segments have been coupled together, the ties 122 are threaded between the rear of the downpipe 12 and the external cladding. The pots 118 are lifted into position so that the fasteners 130, 132 interlock, ensuring that the base of the pot 118 is sitting on the timber screening panel 204*a*, 204*b* below.

The vertical drip point 124 is then installed by drilling a small 3 mm hole in the lateral section 126 of the downpipe 112 directly above the centre of your highest pot 118*a*. A small chain 129, or plastic strip, is coupled to the downpipe 12 at the location of the hole. Water travels down the chain 129 when it rains. This will direct a controlled flow of rainwater from your downpipe 112 onto your highest pot 118*a*, the water will filter down through the soil and the drainage points 120 at the bottom of the pots, dripping down to the next pot 118*b* and so on. Affectively watering itself while your not there.

The assembly 100 is now ready for plants and soil to be added, the pots 118 can easily be detached and reattached for this purpose. If you don't like the position of this garden or the aspect of the garden in relation to the plants you have chosen, simply remove the pots 118, cut the cable ties 122 and move it to another downpipe location on your home. Or if you are moving home take it with you and attach it there.

The assembly 100, including the segments 117 of the base support structure 116 and the receptacles 118 are preferably made of polymer plastic.

Many modifications will be apparent to those skilled in the art without departing from the scope of the present invention Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge in Australia.

LIST OF PARTS

10 Vertical garden assembly
12 Down pipe
14 Building
16 Base support structure
16*a*, 16*b* Elongate member
18 Receptacle
18*a* First receptacle
18*b* Second receptacle
20 Drainage slot
21*a*, 21*b* Long side
22 Fixing apparatus
23*a*, 23*b* Short side
24 Vertical drip point
25 Base member
26 Lateral section
27 Slot

28 Receptacle support
29 Chain
30 Slot
32 Screw
34 Eave
36 Cleat
38 Reducer
100 Vertical garden assembly
112 Down pipe
114 Building
116 Base support structure
117 Segment
118 Receptacle
118*a* First receptacle
118*b* Second receptacle
119 Raised edge
120 Drainage slot
121*a*, 21*b* Long side
122 Fixing apparatus
123*a*, 23*b* Short side
124 Vertical drip point
125 Base member
126 Lateral section
127 Slot
129 Chain
130 Fastener
132 Fastener
134 Eave
136 Cleat
138 Reducer
202*a*, 202*b* Upright
204*a*, 204*b* Horizontal bridging member
206 Receptacle fastener
208 Front side
210 Segment fastener
212*a*, 212*b* Lateral fasteners
214 Transverse fastener
216 Gap

The invention claimed is:

1. A vertical garden assembly for coupling to a downpipe of a building, including:

(a) an elongate base support structure, said base support structure having a direction of extent that is coaxial to the downpipe; and (b) a series of receptacles coupled, in spaced apart positions, to the base support structure in said direction of extent, wherein each receptacle of said receptacles is shaped to hold soil for growing plants therein, wherein the base support structure includes a series of frame segments coupled together in series, wherein each one of said segments includes:

(a) first and second uprights separated by a horizontal bridging member;

(b) a receptacle fastener bridging a front side of a lower section of the uprights; and (c) a segment fastener for coupling the segment to a next successive segment the series, and wherein each segment fastener includes:

(a) two lateral fasteners that extend along corresponding uprights; and (b) a transverse fastener that bridges the lateral fasteners, wherein, in each segment, a gap is defined between the uprights, the lateral fasteners, and the transverse fastener, the gap being of sufficient size to receive upper sections of uprights said next successive segment in the series.

2. The vertical garden assembly claimed in claim 1, wherein the base support structure includes one elongate member that extends the length of the assembly.

3. The vertical garden assembly claimed in claim 1, wherein the base support structure includes two adjacent elongate members that extend in parallel the length of the assembly.

4. The vertical garden assembly claimed in claim 1, wherein each receptacle includes one or more drainage slots so that, in use, water received by a first receptacle in the series in part drains through to the second receptacle in the series and so forth.

5. The vertical garden assembly claimed in claim 1, wherein each one of said receptacles is shaped to at least partially wrap around the downpipe.

6. The vertical garden assembly claimed in claim 5, wherein each receptacle has a generally rectangular shape defined by two long sides, two short sides and a base member.

7. The vertical garden assembly claimed in claim 6, wherein a long side of each receptacle is shaped to at least partially wrap around the downpipe.

8. The vertical garden assembly claimed in claim 7, wherein the long side includes a "U" shaped slot shaped to at least partially receive the downpipe therein.

9. The vertical garden assembly claimed in claim 1, including fixing apparatus for coupling the base support structure to the downpipe.

10. The vertical garden assembly claimed in claim 9, wherein the fixing apparatus includes one or more cable ties.

11. The vertical garden assembly claimed in claim 1, including a vertical drip point for coupling to a section of the downpipe so as to divert some of the water travelling through the downpipe into a first receptacle in the series of receptacles.

12. The vertical garden assembly claimed in claim 11, wherein the vertical dripping point is a slot formed in a lateral section of the downpipe.

13. The vertical garden assembly claimed in claim 1, including a plurality of receptacle supports coupled in spaced apart positions to the base support structure, and wherein the receptacle supports each, in part, support vertical loads of corresponding receptacles.

14. The vertical garden assembly claimed in claim 1, including a plurality of receptacle supports coupled in spaced apart positions to the base support structure, and wherein the receptacle supports at least partially obscure view of the base support structure, the downpipe, or both the base support structure and the downpipe.

15. The vertical garden assembly claimed in claim 1, including a plurality of receptacle supports coupled in spaced apart positions to the base support structure, and wherein the receptacle supports are arranged in pairs of generally rectangular boards interposed between adjacent receptacles in the series of receptacles.

16. The vertical garden assembly claimed in claim 1, wherein the receptacles are removably coupled to the base support structure.

17. The vertical garden assembly claimed in claim 1, wherein each segment fastener includes:

(a) two lateral fasteners that extend along corresponding uprights; and (b) a transverse fastener that bridges the lateral fasteners, wherein, in each segment, a gap is defined between the uprights, the lateral fasteners, and the transverse fastener, the gap being of sufficient size to receive upper sections of uprights said next successive segment in the series series.

18. The vertical garden assembly claimed in claim 1, wherein the lateral fasteners bear against respective uprights of the next successive segment in the series and thereby inhibit lateral movement of the same.

19. The vertical garden assembly claimed in claim 1, wherein the transverse fastener bear against respective uprights of the next successive segment in the series and thereby inhibit transverse movement of the same.

20. The vertical garden assembly claimed in claim 1, wherein each receptacle includes one or more drainage slots so that, in use, water received by a first receptacle in the series in part drains through to the second receptacle in the series and so forth.

21. The vertical garden assembly claimed in claim 1, wherein each one of said receptacles is shaped to at least partially wrap around the downpipe.

22. The vertical garden assembly claimed in claim 21, wherein each receptacle has a generally kidney shape defined by two long sides, two short sides and a base member.

23. The vertical garden assembly claimed in claim 22, wherein a long side of each receptacle is shaped to at least partially wrap around the downpipe.

24. The vertical garden assembly claimed in claim 23, wherein the long side includes a "U" shaped slot shaped to at least partially receive the downpipe therein.

25. The vertical garden assembly claimed in claim 1, including fixing apparatus for coupling the base support structure to the downpipe.

26. The vertical garden assembly claimed in claim 25, wherein the fixing apparatus includes one or more cable ties.

27. The vertical garden assembly claimed in claim 1, including a vertical drip point for coupling to a section of the downpipe so as to divert some of the water travelling through the downpipe into a first receptacle in the series of receptacles.

28. The vertical garden assembly claimed in claim 1, wherein the vertical dripping point is a slot formed in a lateral section of the downpipe.

29. The vertical garden assembly claimed in claim 1, wherein the base support structure includes a series of frame segments coupled together in series and including a plurality of receptacle supports coupled in spaced apart positions to the base support structure wherein the receptacle supports each, in part, support vertical loads of corresponding receptacles.

30. The vertical garden assembly claimed in claim 1, wherein the base support structure includes a series of frame segments coupled together in series and including a plurality of receptacle supports coupled in spaced apart positions to the base support structure wherein the receptacle supports at least partially obscure view of the base support structure, the downpipe, or both the base support structure and the downpipe.

31. The vertical garden assembly claimed in claim 1, wherein the base support structure includes a series of frame segments coupled together in series and including a plurality of receptacle supports coupled in spaced apart positions to the base support structure, wherein the receptacle supports are arranged in pairs of generally rectangular boards interposed between adjacent receptacles in the series of receptacles.

32. The vertical garden assembly claimed in claim 1, wherein the receptacles are removably coupled to respective ones of the segments of the base support structure.

* * * * *